United States Patent [19]  [11] 4,005,055
Miron et al. [45] Jan. 25, 1977

[54] ANAEROBIC AMINIMIDE CURING COMPOSITIONS

[75] Inventors: Jerry Miron, Livingston; Manilal Savla, Parsippany; Irving Skeist, Summit, all of N.J.

[73] Assignee: Skeist Laboratories, Incorporated, Livingston, N.J.

[22] Filed: May 22, 1975

[21] Appl. No.: 580,047

[52] U.S. Cl. .......................... 260/47 UA; 156/331; 260/47 UP; 260/77.5 BB; 526/23; 526/46; 526/55; 526/204; 526/205; 526/210; 526/217; 526/220; 526/230; 526/247; 526/258; 526/292; 526/298; 526/312

[51] Int. Cl.² ............. C08F 120/02; C08F 120/52; C08F 124/00; C08F 18/24

[58] Field of Search ... 260/47 UA, 47 UP, 77.5 BB, 260/89.7 R, 88.7 A, 88.3 A, 89.5 N; 526/312, 298, 292, 247, 258, 23, 55, 301, 46, 230, 210, 217, 220, 204, 205

[56] References Cited

UNITED STATES PATENTS

| | | | |
|---|---|---|---|
| 3,428,614 | 2/1969 | Brownstein | 260/77.5 BB |
| 3,664,990 | 5/1972 | Slagel | 260/89.7 R |
| 3,720,656 | 3/1973 | Manaba | 260/88.7 A |
| 3,728,387 | 4/1973 | Freis et al. | 260/89.7 R |
| 3,756,994 | 9/1973 | Cubertson et al. | 260/77.5 BB |
| 3,775,385 | 11/1973 | Ozono | 260/88.3 A |

*Primary Examiner*—Joseph L. Schofer
*Assistant Examiner*—Herbert J. Lilling
*Attorney, Agent, or Firm*—Dorfman, Herrell and Skillman

[57] ABSTRACT

Anaerobic curing compositions are provided which comprise an alpha-olefinically substituted aminimide and an organic hydroperoxide as a sealant composition having extended shelf life in the presence of oxygen and being rapidly polymerizable upon the exclusion of oxygen.

18 Claims, No Drawings

ANAEROBIC AMINIMIDE CURING COMPOSITIONS

BACKGROUND OF THE INVENTION

The development of anaerobic curing compositions based on a combination of certain acrylic-glycol esters with selected organic hydroperoxides as polymerization initiators has been described by Vernon K. Krieble in U.S. Pat. No. 2,895,950 and in numerous other United States patents since issued to the Loctite Corporation. As set forth in those patents, anaerobic curing is defined as the property of a polymerizable compound to polymerize rapidly and spontaneously to the solid state upon the exclusion of air or oxygen from the compound.

A particularly useful feature of such compositions is that, in addition to having anaerobic curing characteristics, the compositions have a long shelf life in the liquid state as long as contact with air is maintained. Compositions such as described above are found to be especially useful for joining adjacent surfaces of metal or glass, for fastening nuts on mating threads, for holding in place set-screws, tapered pins, wedges, clamps, shaft-hub assemblies, as well as for sealants in a wide variety of purposes.

Because of the growing commercial importance of anaerobic fastening and sealing technology, other polymerizable systems which would polymerize or cure under anaerobic conditions have been sought.

SUMMARY OF THE INVENTION

It has been discovered that compositions based on alpha-olefinically substituted organic compounds possessing the functional group

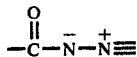

in combination with an appropriate organic hydroperoxide exhibit the characteristics of remaining in the liquid state as long as contact with air or oxygen is maintained and undergo polymerization or curing when subjected to anaerobic conditions. Organic compounds bearing the functional group described above have been given the name "aminimide" by the Ashland Chemical Company, which has developed this new family of compounds to commercial availability, descriptions of which can be found in numerous United States patents and in other publications.

The carbon-carbon unsaturated aminimides that can be used in anaerobic curing compositions comprise hydroxy substituted aminimides and reaction products of the hydroxy substituted aminimides with such reactants as isocyanates, epoxides, carboxylic acids and anhydrides. The hydroxy substituted aminimides correspond to the general formula

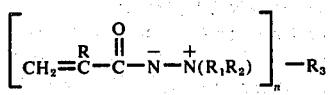

wherein R is hydrogen, lower alkyl ($C_1$–$C_6$), fluorine, chlorine, bromine or cyano radical, $R_1$ and $R_2$ are each lower alkyl radicals, $R_3$ is a group containing at least one hydroxyl radical and is selected from the group consisting of hydroxyalkyl, oxy-bis-hydroxyalkyl, alkylene-bis-oxyhydroxyalkyl, alkoxyhydroxyalkyl, acryloxyhydroxyalkyl, methacryloxyhydroxyalkyl, allyloxyhydroxyalkyl, vinyloxyhydroxyalkyl and polyoxyalkyl-bis-hydroxyalkyl radicals, and $n$ is an integer having a value of 1 or 2. The $R_3$ radicals can be substituted with fluorine or other radicals which do not interfere with the functioning of the aminimide in the anerobic compositions.

The required unsaturated aminimides can be conveniently prepared by reacting an unsymmetrically disubstituted hydrazine such as 1,1-dimethylhydrazine with a carboxylic ester such as methyl acrylate or methyl methacrylate and an appropriate epoxide or diepoxide, following the method described by R. C. Slagel, Journal of Organic Chemistry, 33 1374 (1968).

Illustrative of unsaturated aminimides which can be prepared as described above and which can be used in the practice of this invention are the following:

1. $CH_2 = C(CH_3)CO—N^-—N^+(CH_3)_2—CH_2—CHOH—CH_2—O—CH_2—CH=CH_2$
2. $CH_2 = CHCO—N^-—N^+(CH_3)_2—CH_2—CHOH—CH_2—O—CH_2—CH=CH_2$
3. $CH_2 = C(CH_3)CO—N^-—N^+(CH_3)_2—CH_2—CHOH—CH_2—O—COC(CH_3)=CH_2$
4. $CH_2 = CHCO—N^-—N^+(CH_3)_2—CH_2—CHOH—CH_2—O—COCH=CH_2$
5. $[CH_2 = C(CH_3)CO—N^-—N^+(CH_3)_2]_2[—CH_2—CHOH—CH_2—O—(CH_2)_4—O—CH_2—CHOH—CH_2—]$
6. $CH_2 = C(C_2H_5)CO—N^-—N^+(CH_3)_2CH_2—CHOH—CH_2—O—CH_2—CH=CH_2$
7. $CH_2 = C(n—C_4H_9)CON^-—N^+(CH_3)_2—CH_2—CHOH—CH_2—O—CH_2—CH=CH_2$
8. $CH_2= C(CN)CO—N^-—N^+(CH_3)_2—CH_2—CHOH—CH_2—O—COC(CN)=CH_2$
9. $CH_2 = CFCO—N^-—N^+(CH_3)_2—CH_2—CHOH—CH_2—O—CH_2—CH=CH_2$
10. $CH_2 = C(Cl)CO—N^-—N^+(CH_3)_2—CH_2—CHOH—CH_2—O—CH_2—CH=CH_2$
11. $CH_2 = C(Br)CO—N^-—N^+(CH_3)_2—CH_2—CHOH—CH_2—O—CH_2—CH=CH_2$
12. $CH_2 = C(CH_3)CO—N^-—N^+(CH_3)_2—CH_2—CHOH—CH_2—O—CH=CH_2$
13. $[CH_2 = C(CH_3)CO—N^-—N^+(CH_3)_2]_2[—CH_2—CHOH—CH_2—O—CH_2—CHOH—CH_2—]$
14. $[CH_2 = C(CH_3)CO—N^-—N^+(CH_3)_2]_2[—CH_2—CHOH—CH_2—(O—CH_2CH_2)_x—O—CHOH—CH_2—]$

The $R_3$ radical of 14 would be representative of an epoxidized polyoxyalkylene glycol; the value of $x$ would be such that the $R_3$ radical would be in the molecular weight range of about 200 to about 1000.

As noted above, the hydroxy substituted aminimides can be further reacted with monofunctional or polyfunctional epoxides, isocyanates, carboxylic acids or anhydrides by procedures well known in the art for these reactants to provide additionally modified aminimides of varied characteristics for use in anaerobic curing compositions. Such a product can be illustrated by reaction of the aminimide corresponding to No. 1 in the listing above with toluene diisocyanate to give the carbamate substituted aminimide

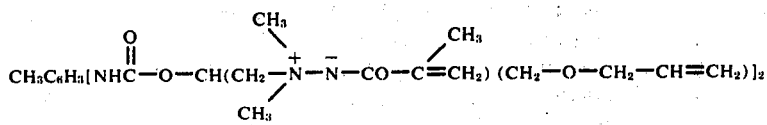

Similarly, reaction of toluene diisocyanate with an aminimide $CH_2=C(CH_3)CO-N^--N^+(CH_3)_2-CH_2-CHOH-CH_3$ will give the carbamate substituted aminimide which can be represented as $[CH_2=C(CH_3)CO-N^--N^+(CH_3)_2-CH(CH_3)-O-]_2R_3$ where $R_3$ is $CH_3C_6H_3(NHCO-)_2$ Similar substituted aminimides can be produced, as indicated above, from reaction of a hydroxy aminimide with appropriate acids such as terepthalic, is ophthalic or adipic acid, or with anhydrides such as phthalic anhydride, maleic anhydride, pyromellitic dianhydride or benzophenone tetracarboxylic acid dianhydride. Also, as noted above, substituted aminimides can be provided by reacting the hydroxy aminimide with an appropriate mono or polyepoxide. A wide variety of epoxides can be used for this purpose such as, for example, diglycidyl ethers of diols such as ethylene glycol, propylene glycol, 1,4-butanediol or bis-2,2'—(p-hydroxyphenyl) propane; also n-butyl glycidyl ether, bis(3,4-epoxy-6-methylcyclohexylmethyl) adipate, bis-(2,3-epoxy cyclopentyl) ether, dicyclopentadiene dioxide, 1,2-epoxy-6-(2,3-epoxypropoxy) hexahydro-4,7-methanoindane, vinylcyclohexene dioxide, bis-3,4-epoxy-2,5-endomethylene cyclohexyl succinate and bis-epoxy dicyclopentyl succinate. Likewise, various fluorinated diglycidyl ethers can be used, such as mide but they can also be used as a starting material along with an appropriate unsymmetrically disubstituted hydrazine and an acrylic ester to produce aminimides that may be desired, following the method of preparation described above.

An important consideration in selecting the aminimide for use in the practice of this invention is that for most ready or convenient application of the sealing composition on to the adjacent or mating surfaces whereupon anaerobic curing is to be effected, the composition should be in the liquid or fluid state. Specific fluidity or viscosity characteristics of the sealing composition will be governed by the requirements of the particular assembly operation. Normally, therefore, the most suitable aminimide compositions for this purpose are those which are liquid at ordinary temperatures. Normally solid aminimides can be utilized, for example, by using in mixtures with another aminimide composition, especially with one that is a liquid under the prevailing conditions, or with an appropriate acrylic ester. In some cases, incorporation of a suitable plasticizer with the solid aminimide may be feasible, provided there is no adverse effect on the subsequent curing of the composition.

As indicated above, the unsaturated aminimides exhibit sustained shelf life in the liquid state and undergo

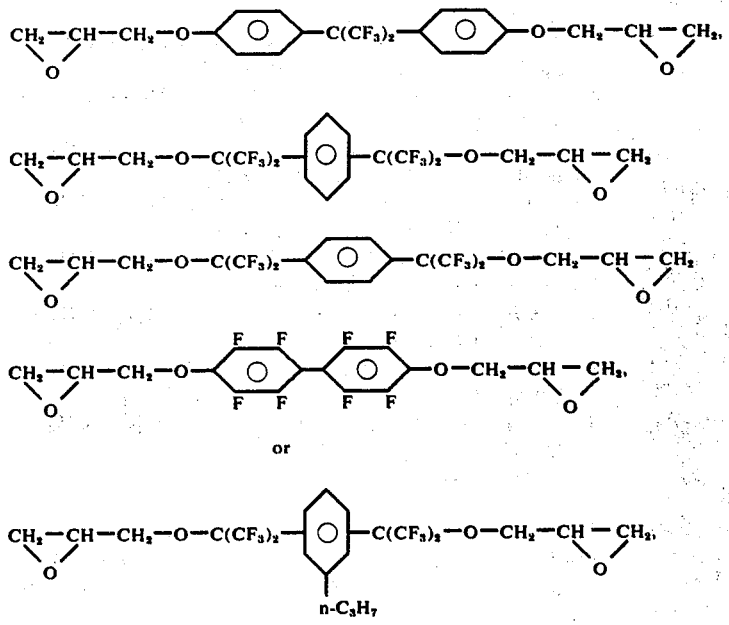

Still other epoxides that can be used to modify the aminimides include those producible by reaction of an epoxidizing agent such as epichlorohydrin on compounds such as aniline, p-aminophenol, cyanuric acid, hydantoin, tribromoaniline, bis(4-hydroxyphenyl) sulfone, dinaphthols as well as with various phenol-aldehyde (Novolac type) resins having from 2 to about 10 repeating units. Some of the epoxides described above can be utilized not only to modify a preformed aminianaerobic curing or polymerization when combined with an appropriate peroxy polymerization initiator. Especially suitable peroxy initiators for use with the polymerizable aminimides are the organic hydroperoxides of the general formula $R_4OOH$ wherein $R_4$ is a hydrocarbon radical containing up to about 18 carbon atoms and preferably an alkyl, aryl or aralkyl radical containing from 1 to about 12 carbon atoms. Typical hydroperoxides that can be used include cumene hydroperoxide, methyl ethyl ketone hydroperoxide and hydroperoxides formed by oxygenation of various hydrocarbons such as methylbutene, cetane or cyclohexene as well as other compounds convertible to hydroperoxides. These hydroperoxides are characterized by the fact that the atoms directly linked to the carbon atom bearing the hydroperoxide radical are selected from the group consisting of carbon, hydrogen, nitrogen or oxygen and in such cases where all of the directly linked atoms are carbon, not more than two of the carbon atoms comprise the carbon atoms of a methyl group.

The amount of peroxy initiator used with the unsaturated aminimide in order to impart anaerobic curing characteristic is generally from about 0.01 to about 20% by weight of the initiator-aminimide combination, and preferably from about 0.1 to about 10% by weight.

In addition to the initiators described above, various other activators, accelerators or inhibitors can be added to the formulation depending upon particular needs or special performance effects that may be desired. Suitable activators are organic tertiary amines wherein all three valences of the nitrogen atom are satisfied by carbon atoms. The carbon atoms may be part of alkyl, carbocyclic or heterocyclic radicals, either substituted or unsubstituted. In general, dialkyl aryl amines or trialkylamines are most convenient to use. Exemplary amines which can be employed are N,N-dimethylaniline, N,N-dimethyl-m-toluidine, N,N-dimethyl-p-toluidine, dimethylethanolamine, triethylamine, tripropylamine, tributylamine or triamylamine. The tertiary amine activator will in general be used in an amount ranging from 0.1 to 10% by weight, based on the weight of the composition and preferably about 2 to 8% by weight to provide optimum shelf storage and curing characteristics.

To provide an accelerated rate of curing, an accelerator such as an imide or formamide or combinations of these, can also be added to the sealing composition. Suitable accelerators include o-benzoic sulfimide, succinimide, phthalimide, formamide, N-substituted formamides such as N-methyl or N-ethyl formamide and metal salts of the imides such as sodium saccharin. Preferred among those are o-benzoic sulfimide and formamide, with o-benzoic sulfimide being especially preferred for optimum acceleration together with good shelf stability. Amounts of the accelerator for advantageous results range from about 0.05 to 5% by weight, based on the weight of the composition and preferably 0.1 to 2% by weight.

The addition of an inhibitor or stabilizer to the sealing composition affords improved shelf life, which may be desired or necessary in some compositions formulated to effect rapid curing. Stabilizers that can be used include various phenolic compounds as well as various quinones. Examples of these include 2,6-ditertiary butyl-p-cresol, 1,4-benzoquinone, 2,5-dihydroxy-1,4-benzoquinone, 1,2-naphthoquinone and 9,10-anthraquinone, with the first three named being preferred. The stabilizers are effective in amounts as small as 10 ppm (parts per million) and can be used in amounts up to 1000 ppm. In general, effective stabilization is realized in the range of 25–500 ppm and the preferred range for most compositions is 50–250 ppm, all amounts above being based on the weight of the sealing composition.

The aminimide sealing compositions described above will remain in the fluid state as long as some air or oxygen is present. For convenience, the polymerizable monomer in that condition may be referred to as unoxygenated, in order to distinguish from the condition wherein the monomer is oxygenated; that is, by passing oxygen through it for a sustained period, as described in U.S. Pat. No. 3,628,178. When the mixture is entirely excluded from contact with air, such as when the mixture is applied between adjacent surfaces, for instance, between the threads of a threaded connection or between plates or the like, the material will polymerize rapidly and form a strong bond.

The time required to form a strong bond upon the exclusion of air may be varied over a considerable range by appropriate selection of the materials added and the amount thereof, especially in respect to the initiator as well as activator, accelerator and inhibitor that may be incorporated into a particular formulation. In general, such bonding or sealing operations will be effected at ambient temperature of the particular shop or other place of assembly. As with other chemical reactions an acceleration of the rate of polymerization or curing would be expected with a rise in temperature.

The anaerobic curing compositions of this invention can be used for joining adjacent surfaces of metal or glass in a variety of applications including the locking of threaded or unthreaded coaxial components such as nuts and bolts, studs, axles and the like, in industrial, automotive and farm machinery assembly and repair, in assembly or repair of appliances, machine tools, valves, fittings, construction equipment, electronic and electrical equipment, in maintenance and machinery repair, in textile and paper mill operations, chemical and food processing, in refineries, steel plants and mining operations, for locking bolts on railroad tracks, for sealing gaskets, weld leaks, tubing and hydraulic joints and the like.

While many metals have an accelerating effect on the curing of the sealing composition, some metals, such as zinc or cadmium, do not show this effect. When surfaces of such metals are to be bonded, they are pretreated with a suitable heavy metal priming compound such as ferric chloride or carboxylic acid salts of metals such as cobalt, manganese, or lead. Likewise, when glass surfaces are to be bonded, more satisfactory results are obtained if the glass surface is primed, for example, with cobaltous or similar salts.

Because of the catalytic or curing effect of various metals, as noted above, it is generally more satisfactory to store the sealing composition in a non-metal container such as those of glass or plastic, and preferably in one of a plastic which is permeable to oxygen, such as a polyethylene container.

DESCRIPTION OF PREFERRED EMBODIMENTS

The invention in its preferred embodiments is more fully illustrated in the examples to follow:

EXAMPLE 1

A sealing formulation was prepared from a liquid aminimide having the structure

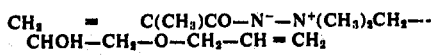

with approximately 10% by weight of cumene hydroperoxide and 2.5% by weight of dimethylethanolamine. The resulting liquid applied to a nut and bolt assembly appeared to reach the cured state after 2 days at room temperature.

EXAMPLE 2

A sealing formulation was prepared by dissolving 50 grams of a solid aminimide having the structure

CH₂ = C(CH₃)CO—N⁻—N⁺(CH₃)₂—CH₂— CHOH—CH₂—O—CO—C(CH₃) = CH₂ in 50 grams of the liquid aminimide described in Example 1 along with approximately 10% by weight, based on total formulation, of cumene hydroperoxide and 2.5% by weight of dimethylethanolamine. The mixture was applied to (a) a nut and bolt assembly, (b) glass plates and (c) steel plates, and left overnight at room temperature.

The formulation in the nut and bolt assembly was found to be cured; the nut could not be removed by hand. The other two assemblies had not cured.

Two glass slides were treated with a dilute solution of cobaltous chloride and dried in an oven to evaporate the water, after which the sealant mixture to which a small amount of formamide (approximately 1% by weight) had been added was applied to the mating surfaces. The assembled glass slides showed some evidence of curing within 3 hours and were strongly cured at 24 hours.

EXAMPLE 3

An aminimide was prepared by reacting 2.7 grams of the diglycidyl ether of 1,4-butanediol, 1.2 grams of 1,1-dimethylhydrazine and 2.0 grams of methyl methacrylate in 5.9 grams of isopropyl alcohol overnight at 40° C.

After removal of the isopropyl alcohol, adhesive formulation A was prepared from 1.6325 grams of the above reaction product, 0.1143 gram (7% by weight) of cumene hydroperoxide and 0.0326 gram (2% by weight) of dimethylaniline. Formulation B was prepared from 1.13 grams of the reaction mixture, 0.0226 gram (2%) of cumene hydroperoxide, 0.0565 gram (0.5%) of formamide and 0.0113 gram (1%) of dimethylaniline. Both formulations were used as adhesives for nut and bolt assemblies. On inspection of the assemblies after 18 hours, both formulations were found to be cured.

The aminimide of this example can be represented as [CH₂ = C(CH₃)CO—N⁻—N⁺(CH₃)₂]₂R₃ where R₃ is —CH₂—CHOH—CH₂—O—(CH₂)₄—O—CH₂—CHOH—CH₂—.

EXAMPLE 4

An isocyanate modified aminimide was prepared by reacting two moles of the aminimide of Example 1 and one mole of toluene diisocyanate in an acetone suspension. After removal of the acetone solvent, an adhesive formulation was prepared from 0.2906 gram of the above reaction product, 0.2906 gram of isobutyl methacrylate, 0.0407 gram (7%) of cumene hydroperoxide, 0.0116 gram (2%) of formamide and 0.0116 gram (2%) of dimethylaniline. The formulation inserted in nut and bolt assemblies was found to be cured overnight.

The modified aminimide described above can be represented as

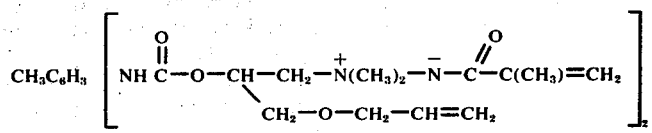

EXAMPLE 5

A sealing composition was formulated from the aminimide of Example 3 with 7% by weight of the hydroperoxide of methyl ethyl ketone, 2% of formamide and 2% of N,N-dimethyl-m-toluidine. The sealant was applied to conventional stove nuts and bolts and to cadmium plated nuts and bolts which had previously been treated with a 10% aqueous ferrous sulfate solution and dried. In both cases, the assemblies were cured after overnight storage. On application of a second sample of the sealant, both types of assemblies were found to be cured after 5 hours.

The hydroperoxide of methyl ethyl ketone was prepared by bubbling oxygen through the ketone held at about 50° C for approximately 40 hours.

EXAMPLE 6

Following the method described by R. C. Slagel, Journal of Organic Chemistry, 33 1374 (1968), an aminimide was prepared by reacting 77.5 grams of a diglycidyl ether of polypropylene glycol (approximately 9 propylene glycol units), 100 grams of methyl methacrylate and 60 grams of 1,1-dimethylhydrazine in 237.5 grams of isopropyl alcohol.

After removal of the isopropyl alcohol sealing composition A was formulated from 100 grams of the above reaction product, 2 grams of cumene hydroperoxide, 0.5 gram of o-benzoic sulfimide and 0.5 gram of 1,2,3,4-tetrahydroquinoline; sealing composition B was formulated from 100 grams of the above reaction product, 2 grams of cumene hydroperoxide, 0.5 gram of o-benzoic sulfimide and 0.5 gram of N,N-dimethyl-p-toluidine. Sealant B applied to conventional nuts and bolts was cured overnight; when applied to specially plated nuts and bolt assemblies, the sealant was not cured overnight. Sealant A did not show overnight curing on either of the nut and bolt types.

The aminimide described above can be represented as [CH₂ = C(CH₃)CO—N⁻—N⁺(CH₃)₂—]₂—R₃ where R₃ is —CH₂—CHOH—CH₂—O—[CH₂—C(CH₃)—O—]₉—CH₂—CHOH—CH₂—.

EXAMPLE 7

A carbamate substituted aminimide was prepared by reacting 9 grams of an isocyanate modified polyalkylene glycol (9.45%—N=C=O) with 4 grams of an aminimide of the formula CH₂=C(CH₃)CON—N(CH₃)₂—CH₂—CHOH—CH₃ (molar ratio of aminimide of diisocyanate — 2:1), the reactants being suspended in 6 grams of acetone. After removal of the acetone, a sealing composition was formulated from 2.9862 grams of the above reaction product, 0.7465 gram of isobutyl methacrylate, 0.2613 gram (7% by weight of the composition) of cumene hydroperoxide, 0.0746 gram (2%) of formamide and 0.0746 gram (2%) of dimethylaniline. The above sealant applied to nut and bolt assemblies cured overnight.

We claim:

1. A sealant composition having extended shelf life in the presence of oxygen and being rapidly polymerizable upon the exclusion of oxygen which comprises a mixture of an unoxygenated aminimide monomer selected from the group consisting of (A) hydroxy substituted aminimides corresponding to the general formula [$CH_2$=CR—CO—$N^-$—$N^+$($R_1R_2$)]n —$R_3$, wherein $n$ is an integer having a value of 1 or 2, R is hydrogen, loweralkyl, fluorine, chlorine, bromine or a cyano group, $R_1$ and $R_2$ are each loweralkyl radicals, $R_3$ is selected from the group consisting of hydroxyalkyl and substituted hydroxyalkyl radicals and (B) modified aminimides produced by reaction of the aminimides of (A) with reactants of the group consisting of organic isocyanates, epoxides, organic acids and anhydrides; with from about 0.01 to about 20% by weight, based on the weight of the composition, of an organic hydroperoxide.

2. The composition of claim 1 wherein in (A) $R_3$ is selected from the group consisting of hydroxyalkyl, oxy-bis-hydroxyalkyl, alkylene-bis-oxyhydroxyalkyl, acryloxyhydroxyalkyl, alkoxyhydroxyalkyl, methacryloxyhydroxyalkyl, allyloxyhydroxyalkyl, vinyloxyhydroxyalkyl and polyoxyalkyl - bis - hydroxyalkyl radicals.

3. The composition of claim 2 wherein the unoxygenated aminimide monomer contains at least two alpha-olefinic polymerization sites.

4. The composition of claim 3 which comprises additionally an organic tertiary amine in an amount from 0.1 to 10% by weight, based on the weight of the composition.

5. The composition of claim 4 wherein the tertiary amine is selected from the group consisting of N,N-dimethylaniline, dimethylethanolamine, N,N-dimethyl-m-toluidine, N,N-dimethyl-p-toluidine, triethylamine, tripropylamine, tributylamine and triamylamine.

6. The composition of claim 3 which comprises additionally an agent selected from the group consisting of organic imides and metal salts of organic imides, formamide and N-substituted formamide in an amount from about 0.05 to 5% by weight, based on the weight of the composition.

7. The composition of claim 6 wherein the agent is selected from the group consisting of o-benzoic sulfimide, succinimide, phthalimide, formamide, N-methylformamide, N-ethylformamide and the sodium salt of o-benzoic sulfimide.

8. The composition of claim 7 wherein the agent is selected from the group consisting of o-benzoic sulfimide and formamide.

9. The composition of claim 3 which comprises additionally an inhibitor selected from the group consisting of phenolic and quinone compounds in an amount of 10 to 1000 parts per million.

10. The composition of claim 9 wherein the inhibitor is selected from the group consisting of 2,6-ditertiary butyl-p-cresol, 1,4-benzoquinone, 2,5-dihydroxy -1,4 benzoquinone, 1,2-naphthoquinone and 9,10-anthraquinone.

11. The composition of claim 10 wherein the inhibitor is selected from the group consisting of 2,6-ditertiary butyl-p-cresol 1,4-benzoquinone and 2,5-dihydroxy-1,4-benzoquinone.

12. The composition of claim 3 wherein the aminimide monomer corresponds to A wherein $n$ is 1, R is hydrogen or loweralkyl, $R_1$ and $R_2$ are each loweralkyl and $R_3$ is selected from the group consisting of vinyloxyhydroxyalkyl, allylhydroxyalkyl, acryloxyhydroxyalkyl and methacryloxyalkyl radicals.

13. The composition of claim 12 wherein R, $R_1$, and $R_2$, are each a methyl radical and $R_3$ is selected from the group consisting of allylhydroxyalkyl and methacryloxyalkyl radicals.

14. The composition of claim 3 wherein the aminimide monomer corresponds to A wherein $n$ is 2, R is hydrogen or lower alkyl, $R_1$ and $R_2$ are each lower alkyl and $R_3$ is an alkylene-bis-oxyhydroxyalkyl radical.

15. The composition of claim 14 wherein R, $R_1$ and $R_2$ are each a methyl radical and $R_3$ is — $CH_2$ — CHOH—$CH_2$—O—($CH_2$)$_4$—O—$CH_2$—CHOH—$CH_2$—.

16. The composition of claim 3 wherein the aminimide monomer comprises a hydroxy substituted aminimide corresponding to A which has been modified by reaction with an organic isocyanate.

17. The composition of claim 16 wherein the isocyanate is toluene diisocyanate.

18. The composition of claim 17 wherein $n$ is 1, R, $R_1$, and $R_2$ of the aminimide are each a methyl radical and $R_3$ is selected from the group consisting of —$CH_2$—CHOH—$CH_3$, —$CH_2$—O—$CH_2$—CH=$CH_2$, —$CH_2$—CHOH—$CH_2$—O—CO—C($CH_3$)=$CH_2$ and —$CH_2$—CHOH—$CH_2$—O—CO—CH=$CH_2$ radicals.

* * * * *

UNITED STATES PATENT OFFICE
CERTIFICATE OF CORRECTION

Patent No. 4,005,055                    Dated January 25, 1977

Inventor(s) Jerry Miron, Manilal Savla, Irving Skeist

It is certified that error appears in the above-identified patent and that said Letters Patent are hereby corrected as shown below:

Column 3, lines 10 and 13; subscript should be inserted after last "H" of lines 9 and 12, respectively;
line 16; "is ophthalic" should be --isophthalic--;

Column 8, line 60; the first "N" of the formula should have the superscript (-), the second "N" should have the superscript (+); the closing parenthetic mark and subscript at the start of line 61 should be at the end of line 60;

Column 9, lines 12 and 18; "loweralkyl" should be --lower alkyl--;

Column 10, line 22, middle and end of line; "loweralkyl" should be --lower alkyl--.

Signed and Sealed this

Thirty-first Day of May 1977

[SEAL]

Attest:

RUTH C. MASON
Attesting Officer

C. MARSHALL DANN
Commissioner of Patents and Trademarks